(12) United States Patent
Kodama

(10) Patent No.: US 6,696,681 B2
(45) Date of Patent: Feb. 24, 2004

(54) F-θ LENS, BEAM SCANNING DEVICE, AND IMAGING APPARATUS

(75) Inventor: Kenichi Kodama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 122 days.

(21) Appl. No.: 09/912,538

(22) Filed: Jul. 26, 2001

(65) Prior Publication Data

US 2002/0030158 A1 Mar. 14, 2002

(30) Foreign Application Priority Data

Jul. 26, 2000 (JP) .................................... 2000-225716
Jun. 20, 2001 (JP) .................................... 2001-187261

(51) Int. Cl.[7] .............................................. H01J 3/14
(52) U.S. Cl. ...................... 250/216; 250/235; 359/206; 359/662
(58) Field of Search ............................ 250/234–235, 250/230, 578.1, 216; 359/196–197, 784, 791, 204, 206, 662; 358/470, 494

(56) References Cited

U.S. PATENT DOCUMENTS

| | | | | |
|---|---|---|---|---|
| 4,917,483 A | * | 4/1990 | Nakao | ........................ 359/662 |
| 4,971,411 A | * | 11/1990 | Takanashi | .................... 359/206 |
| 5,251,055 A | * | 10/1993 | Koide | ........................ 359/216 |
| 5,646,767 A | * | 7/1997 | Iima et al. | ................... 359/206 |
| 6,278,108 B1 | * | 8/2001 | Ori | ............................ 250/235 |
| 6,294,778 B1 | * | 9/2001 | Cappiello | ................... 250/234 |

FOREIGN PATENT DOCUMENTS

| | | | |
|---|---|---|---|
| JP | 03-130717 | 6/1991 | ............ G02B/26/10 |
| JP | 06-018803 | 1/1994 | ............ G02B/26/10 |
| JP | 07-005591 | 1/1995 | ............ G03B/27/72 |
| JP | 11-088619 | 3/1999 | ............ H04N/1/113 |

OTHER PUBLICATIONS

"Lens Power and Chromatic Aberration." http://www.hypermaths.org/quadibloc/science/opt0504.htm.*
"L6–91.HTML" http://www.physics.umd.edu/lecdem/services/demos/demosl6/l6–91.htm.*
"Physics 102, Unit 14, Major Concepts." http://www.physics.cornell.edu/courses/p101–102/p102/14/concepts/.*

* cited by examiner

Primary Examiner—David Porta
Assistant Examiner—Patrick J. Lee
(74) Attorney, Agent, or Firm—Sughrue Mion, PLLC

(57) ABSTRACT

An f-θ lens is composed of a negative lens element of a negative power, and second and third lens elements of a positive power, arranged in this order from the side of a optical deflection device, wherein at least one surface of the lens elements is a cylindrical surface that has a refractive power only in the deflecting direction. The f-θ lens satisfies the conditions: N1>N2=N3, v1>v2=v3, and 4 mm≦|f23/f1·D0|<16 mm, wherein N1, N2 and N3 represent refractive indexes, v1, v2 and v3 represent Abbe constants of the first to third lens elements respectively, f1 represents the focal length of the first lens element, f23 represents the composite focal length of the second and third lens elements, and D0 represents a distance from the optical deflection device to the lens surface of the first lens element.

35 Claims, 10 Drawing Sheets

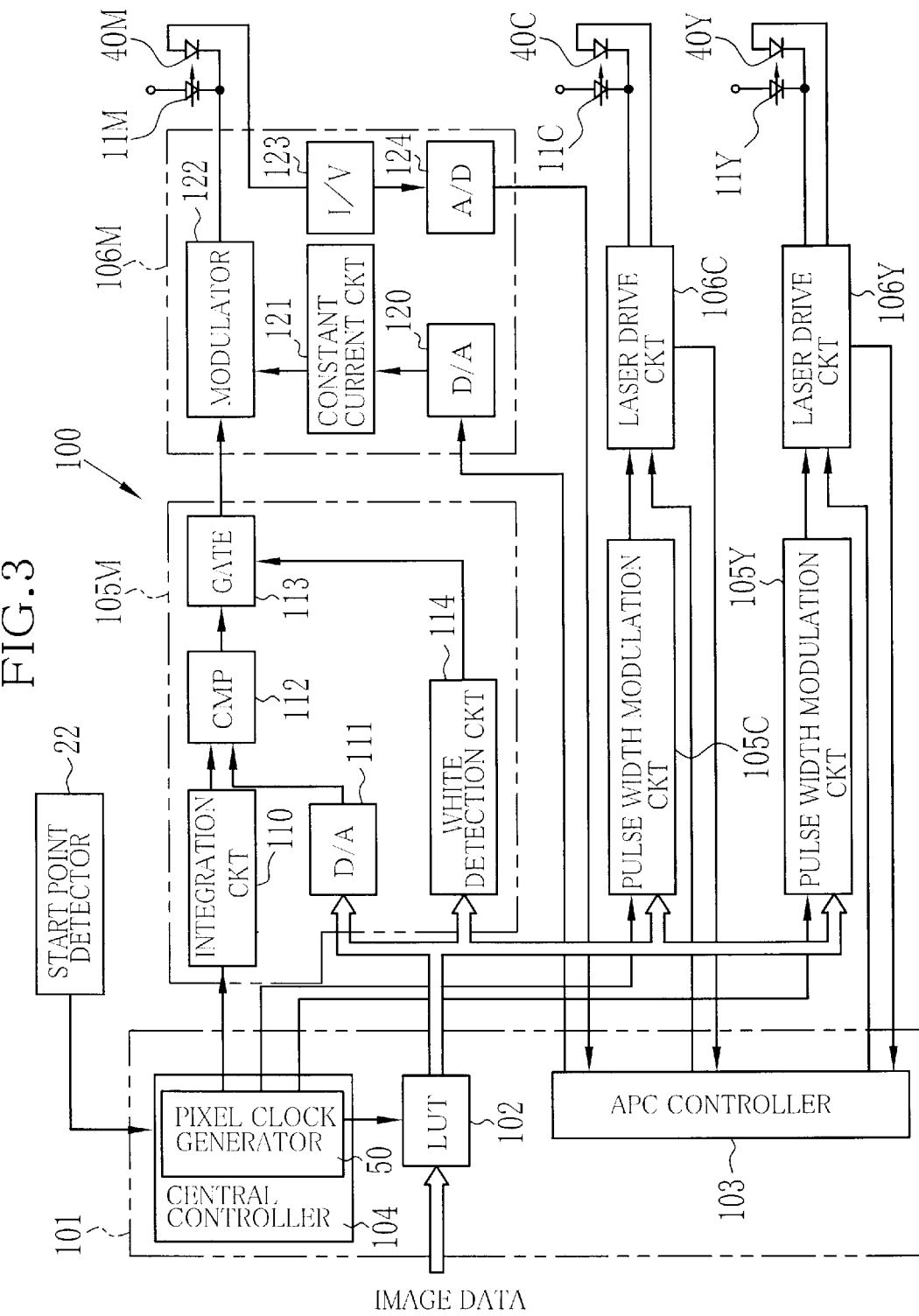

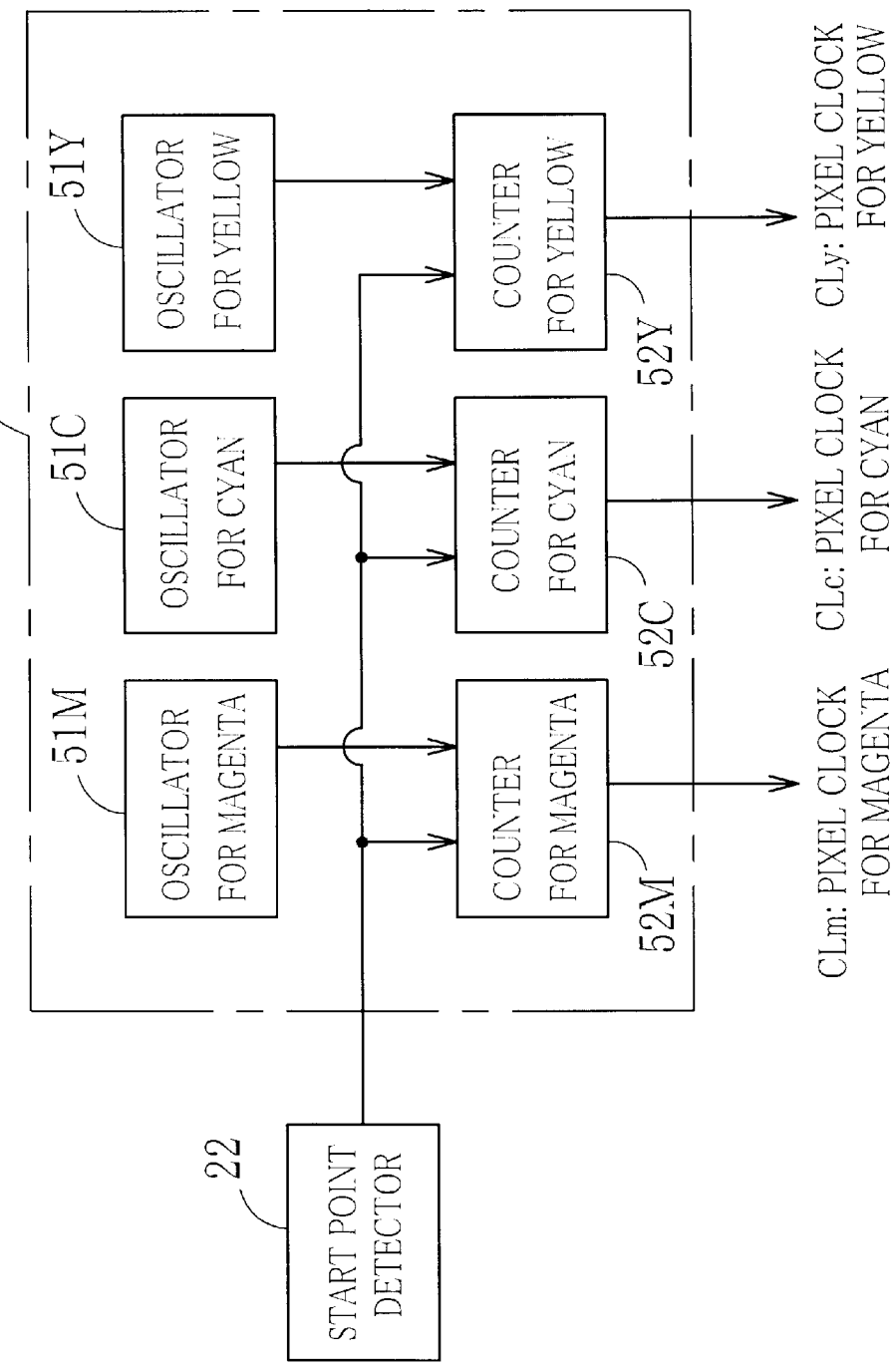

F-θ LENS, BEAM SCANNING DEVICE, AND IMAGING APPARATUS

BACKGROUND ARTS

The present invention relates to an f-θ lens that focuses light beams on a plane and scans the light beams across the scanning plane at substantially constant speed. The present invention relates also to an beam scanning device using the f-θ lens and a color imaging apparatus using the beam scanning device.

The beam scanning device is provided with a light source generating light beams, and an optical deflection device, like a polygonal mirror, that deflects the light beams in a constant direction. The deflected light beams are projected onto a plane through the f-θ lens, to sweep or scan the plane in a constant direction. The f-θ lens is a lens that has a property to make the light beams move on the scanning plane proportionally to a deflection angle θ of the optical deflection device. In the beam scanning device, the f-θ lens is used for making the scanning speed of the light beams on the scanning plane proportional to the deflection speed (the speed per deflection angle of the optical deflection device). Because the scanning plane is held flat in the deflecting or scanning direction, the scanning speed would not be proportional to the deflection speed without the f-θ lens.

The f-θ lens has usually been composed of two or three spherical lens elements, or one or two aspherical lens elements. In the f-θ lens, the light beams pass through each spherical lenses merely in a narrow central zone extending in the deflecting direction, so other peripheral portions of the spherical lenses are cut away, to shape the spherical lenses into strips when used as the components of the f-θ lens.

However, cutting the spherical lens into a strip requires is labor-consuming, because it is necessary to locate the cutting positions very strictly. In addition, since the peripheral portions of the spherical lens are thrown way uselessly, it is a waste of material, and the material cost are pretty large. It is possible to use the whole spherical lenses in the f-θ lens, in order to omit the labor-consuming cutting process. But it is still a waste of lens material, as there remain unused portions in those spherical lenses. Moreover, as compared to the strip-shaped spherical lenses, the whole ones obviously require a larger space, and thus enlarges the apparatus size.

Meanwhile, in the color imaging apparatus where a plurality of light beams having different wavelengths are scanned across a photosensitive material at the same time by the beam scanning device, the scanning lengths of the light beams on the photosensitive material can differ from each other because of chromatic aberration of the f-θ lens. In that case, recorded images will suffer color failures. As well-known in the art, the chromatic aberration is resulted from the fact that the refractive index through a glass or a lens varies depending upon the wavelength.

To prevent the color failure, optical correction of the chromatic aberration of the f-θ lens has usually been made. For correction of the chromatic aberration, selection of glass materials for the lens elements of the f-θ lens is important. Usually, lenses made of crown glass and lenses made of flint glass are usually combined in order to correct the chromatic aberration. For better correction, however, the sorts of glass materials for the f-θ lens are limited to expensive ones, and also the number of lens elements must be increased. Thus, the f-θ lens becomes expensive.

Indeed Japanese Laid-open Patent Application No. 6-18803 discloses an f-θ lens using a cylindrical lens as one component, but the other component of this prior art is a spherical lens, so it needs a relatively high manufacture cost. Although there has been disclosed an f-θ lens system whose components are all cylindrical lenses in Japanese Laid-open Patent Application No. 3-130717, the f-θ lens of this prior art has a problem that sufficient lens performance cannot always be achieved because of tolerance in manufacture. To avoid this problem, this prior art suggests replacing one of the cylindrical lenses of the f-θ lens with a spherical lens. However, this solution results in rising the manufacture cost.

SUMMARY OF THE INVENTION

In view of the foregoing, the present invention has an object to provide an f-θ lens that has superior f-θ characteristics but may be produced at a low cost, on the assumption that the f-θ lens is placed between an optical deflection device that deflects light beams at an approximately constant angular speed in a deflecting direction, and a scanning plane, for converging the deflected light beams on the scanning plane such that the light beams scan the scanning plane at an approximately constant speed in a scanning direction, wherein the scanning plane is flat in the scanning direction of the light beams.

Another object of the present invention is to provide a beam scanning device and a color imaging apparatus, using the f-θ lens of the present invention.

According to the present invention, the f-θ lens is composed of a first lens element having a negative power of refraction, a second lens element having a positive power of refraction and a third lens element having a positive power of refraction, arranged in this order from the side of the optical deflection device, wherein at least one surface of the lens elements is a cylindrical surface that has a refractive power only in the deflecting direction.

The f-θ lens of the present invention uses a cylindrical lens having a curvature only in the deflecting direction of the light beams. Such a cylindrical lens may be manufactured by forming a primary cylindrical lens whose cylindrical surface has a pretty large length in a perpendicular direction to the direction of curvature, and then cutting the primary cylindrical lens along the direction of curvature into a number of lens pieces of a constant width or height. Every one of subsequent cut pieces is usable as a component of the f-θ lens, so any waste is not produced from the primary cylindrical lens. Therefore, the cylindrical lenses used in the f-θ lens of the present invention may be manufactured at a low cost, so the manufacture cost of the f-θ lens of the present invention is low in comparison with the conventional f-θ lens using those lens elements which are manufactured by cutting round lenses into strips. It is to be noted that cutting process of the primary cylindrical lens may be done at any stage of manufacturing the individual lens elements, e.g. before finishing the surface of the primary cylindrical lens.

According to a preferred embodiment, the f-θ lens satisfies the conditions: $N1 > N2 = N3$, $v1 < v2 = v3$, and $4\,mm \leq |f23/f1 \cdot DO| \leq 16\,mm$, wherein N1, N2 and N3 represent refractive indexes, v1, v2 and v3 Abbe represent constants of the first to third lens elements respectively, fi represents the focal length of the first lens element, f23 represents the composite focal length of the second and third lens elements, and DO a distance from the optical deflection device to the lens surface of the first lens element.

This configuration is effective to prevent curvature of the field of the f-θ lens from being worsened, and maintain good speed f-θ characteristics. It is to be noted that the speed f-θ characteristics indicate the proportionality of the scanning speed of the light beams on the scanning plane to the angular speed of deflection. That is, with good f-θ characteristics, the scanning speed of the light beams is maintained constant through the entire scanning length.

According to another preferred embodiment, at least one of the three lens elements is inclined about a parallel axis to the deflecting direction. This configuration is effective to prevent interference caused by multiple reflection of light beams between the lens surfaces. Especially by inclining the first lens element, those light beams multiple-reflected between the optical deflection device and the first lens element are prevented from being projected toward the scanning plane, so the ghosts are effectively prevented.

According to a further embodiment, the first and second lens elements are cemented to each other. This configuration reduces the risk of deviation of the lens elements from their proper positions.

A color imaging apparatus according to the present invention comprises:

a light source having a plurality of light emitting elements for emitting light beams of different wavelengths;

an optical deflection device that cyclically deflects the light beams at an approximately constant angular speed in a deflecting direction;

an f-θ lens placed in optical paths of the deflected light beams from the optical deflection device, for converging the light beams on a scanning plane such that the light beams scan the scanning plane at an approximately constant speed in a scanning direction, wherein the scanning plane is flat in the scanning direction of the light beams, and at least one surface of lens elements of the f-θ lens is a cylindrical surface that has a refractive power only in the deflecting direction;

a clock signal generating device that generates a plurality of clock signals of different frequencies for deciding output timings of the light beams such that the light beams scan the scanning plane from an equal scanning start point through an approximately constant length in the scanning direction; and a light modulation device for modulating the light beams on the basis of the clock signals and image data.

The color imaging apparatus of the present invention shifts the output timings of the light beams of different wavelengths so that the scanning start position of these light beams on the scanning plane will coincide with each other. That is, chromatic aberrations of the f-θ lens are compensated a certain degree by shifting the output timings of the light beams. Therefore, the f-θ lens is not required to correct the chromatic aberrations entirely by itself. So the f-θ lens may be manufactured at a low cost, using inexpensive lens elements that may be produced at a high efficiency from inexpensive glass materials, without lowering the lens performance or the image quality.

BRIEF DESCRIPTION OF THE DRAWINGS

FIG. 3 is a block diagram of a control circuit of the beam scanning device of the color imaging apparatus of FIG. 1;

FIG. 4 is a block diagram of a pixel clock generator included in the control circuit of FIG. 3;

DESCRIPTION OF PREFERRED EMBODIMENTS

Figure 1:
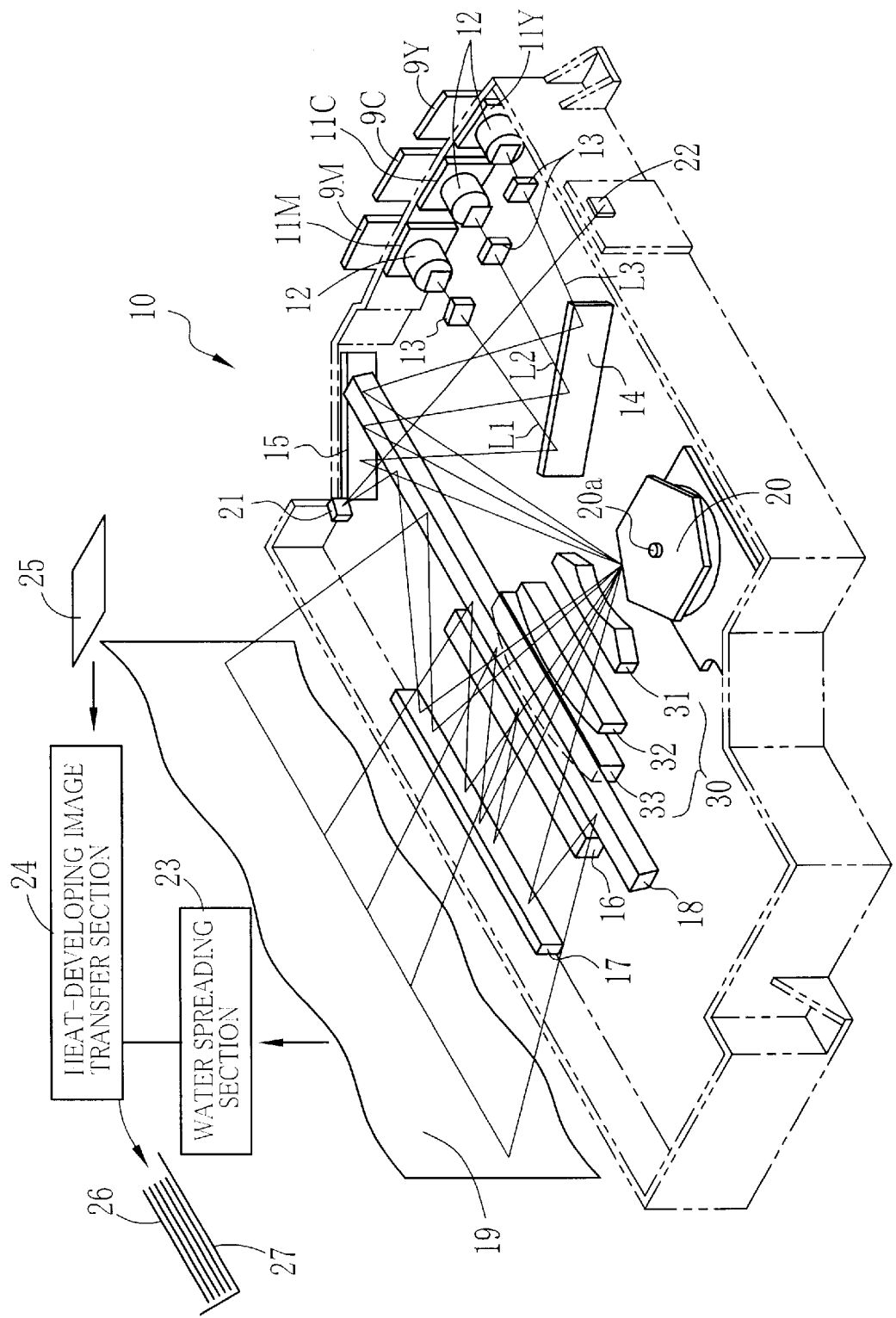
FIG. 1 is a perspective view of an exposure section of a color imaging apparatus according to an embodiment of the present invention.

FIG. 1 shows a print-exposure section 10 of a color imaging apparatus according to an embodiment of the present invention. The print-exposure section 10 is provided with three semiconductor lasers 11M, 11C and 11Y that function as light sources for magenta, cyan and yellow respectively. The semiconductor lasers 11M, 11C and 11Y are respectively force-fitted in and held in radiator plates 9M, 9C and 9Y, for controlling temperatures. The semiconductor lasers 11M, 11C and 11Y emit light beams L1, L2 and L3 having wavelengths of 680 nm, 750 nm and 810 nm respectively.

In the vicinity of light emitting sides of the semiconductor lasers 11M, 11C and 11Y are disposed collimator lenses 12 in one-to-one relationship, for making the light beams L1, L2 and L3 into parallel rays. The parallel light beams L1, L2 and L3 from the collimator lenses 12 are directed to a polygonal mirror 20 through cylindrical lenses 13 and mirrors 14 and 15, such that the light beams L1, L2 and L3 are deflected at a substantially identical point on the polygonal mirror 20 to each other, that may be called a deflection point.

The polygonal mirror 20 functions as a hexagonal deflection device with six reflection surfaces symmetrical about a rotary axle 20a, and is turned at a high speed by a driving force applied from a not-shown motor, so the light beams L1, L2 and L3 are deflected by the polygonal mirror 20 in a constant direction to scan in a constant direction. The scanned light beams L1, L2 and L3 are focused on a surface of a photosensitive material 19 through an f-θ lens 30, a cylindrical lens 16, a reflection mirror 17 and a cylindrical mirror 18. The surface of the photosensitive material 19 is held flat on a predetermined scanning plane, and the light beams L1, L2 and L3 scan this surface in the constant direction. Thus, the f-θ lens 30 may be called a scanning lens, and the surface of the photosensitive material 19 may be called a scanning plane. The cylindrical lenses 13 and 16 respectively have curvatures in a sub scanning direction that is perpendicular to the deflecting direction of the light beams L1, L2 and L3 by the polygonal mirror 20, that is parallel to a main scanning direction of the light beams L1, L2 and L3.

The photosensitive material 19 is conveyed in the sub scanning direction in synchronism with the main scanning of the light beams L1, L2 and L3. Thereby, a two-dimensional image is recorded on the photosensitive material 19 by the light beams L1, L2 and L3.

A mirror 21 is disposed on one side of the reflection mirror 17 such that the light beams L1, L2 and L3 from the polygonal mirror 20 initially fall on this mirror 21. Thus, the mirror 21 is called an SOS (start of scanning) mirror. The reflection mirror 21 reflects and directs the light beams L1, L2 or L3 to a start point detecting sensor 22. The start point detecting sensor 22 outputs a signal each time it receives the light beams L1, L2 and L3. The output signal from the start point detecting sensor 22 is used as a start signal that synchronizes the starting timing of the main scanning of each line, as described in detail later.

The f-θ lens 30 is composed of a first lens element 31 having a negative power of refraction, a second lens element 32 having a positive power of refraction, and a third lens element 33 having a positive power of refraction, in this order from the side of the polygonal mirror 20. At least one of lens surfaces of the three lens elements 31 to 33 of the f-θ lens 30 is shaped into a cylindrical lens surface having a curvature only in the deflecting direction.

Figure 2A:
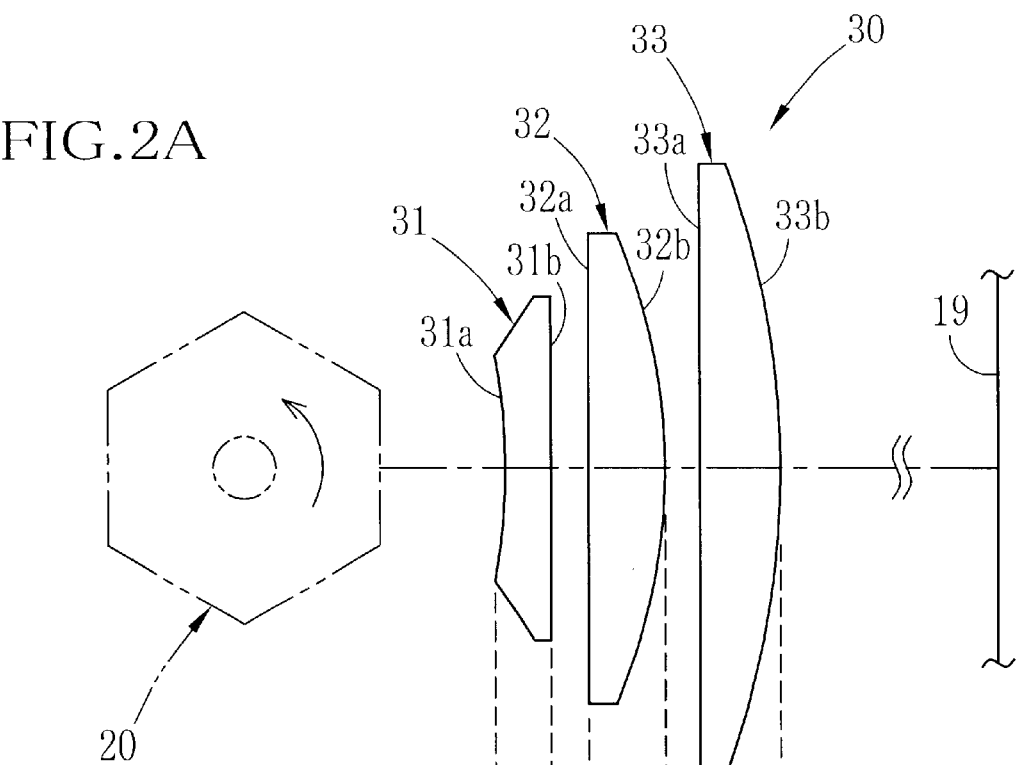
FIG. 2A is a sectional view of an f-θ lens used in a beam scanning device of the exposure section of FIG. 1, taken along a main scan direction that is parallel to a deflecting direction of light beams.

According to the present embodiment, as shown in FIG. 2A, the first lens element 31 has a concave surface 31a and a flat surface 31b, and the concave surface 31a is oriented to the polygonal mirror 20, whereas the second and third lens elements 32 and 33 have a convex surface 32b or 33b on the side of the photosensitive material 19 and a flat surface 32a or 33a on the side of the polygonal mirror 20. The concave surface 31a of the first lens element 31 and the convex surfaces 32b and 33b of the second and third lens elements 32 and 33 are made as the cylindrical lens surfaces, as shown in FIG. 2A that shows a sectional view of the f-θ lens 30 taken along the main scanning direction, or the deflecting direction of the light beams.

The f-θ lens 30 is configured to satisfy the following conditions, provided that the first to third lens elements 31 to 33 have refractive indexes N1, N2 and N3, and Abbe constants v1, v2 and v3, respectively, and f1 represents the focal length of the first lens element 31, f23 represents the composite focal length of the second and third lens elements 32 and 33, and D0 represents the distance from the deflection point on the polygonal mirror 20 to the lens surface 31a of the first lens element 31:

$N1 > N2 = N3$ $v1 < v2 = v3$ $4 \leq |f23/f1 \cdot D0| \leq 16$

In addition, heights y1, y2 and y3 of the first to third lens elements 31 to 33 in the sub scan direction, i.e. a perpendicular direction to the deflecting direction of said light beams as well as to an optical axis of the f-θ lens, are set to be requisite minimum values considering fluctuation in height at which the light beams L1, L2 and L3 are projected from the polygonal mirror 20 toward the f-θ lens 30.

The heights y1, y2 and y3 are determined to satisfy the following relationship: $y1 \leq y2 \leq y3$.

FIG. 3 shows a control device 100 for controlling driving semiconductor lasers 11M, 11C and 11Y that emit laser beams for magenta, cyan and yellow recording respectively. The control device 100 has a main control section 101 that is mainly constituted of a microcomputer and memories. The main control section 101 may be functionally sectioned into a lookup table memory (LUT) 102, an APC controller 103 for an automatic power control (APC), and a central controller 104 for controlling the overall operations of the control device 100. The LUT 102 converts the input image data to have a predetermined format suitable for recording. For example, the LUT 102 converts 8-bit input image data into 12-bit image data. The central controller 104 controls the overall operation of the control device 100, and is provided with a pixel clock generator 50 that generates a clock pulses per pixel that serves as a timing signal for the scanning on the photosensitive material 19.

To the main control section 101 are connected three pulse width modulation circuits 105M, 105C and 105Y. The pulse width modulation circuit 105M is connected to the semiconductor laser 11M through a laser drive circuit 106M. The pulse width modulation circuits 105C and 105Y are connected to the semiconductor lasers 11C and 11Y through laser drive circuits 106C and 106Y, respectively.

The pulse width modulation circuit 105M is provided with an integration circuit 110 and a D/A converter 111. The integration circuit 110 is supplied with the pixel clock signal from the pixel clock generator 50 of the central controller 104, and the D/A converter 111 is supplied with the 12-bit image data from the LUT 102. An output terminal of the integration circuit 110 is connected to one of a pair of input terminals of a comparator 112. The integration circuit 110 outputs an integrated signal having a saw-tooth shape that is produced by integrating the pixel clock signal. The other input terminal of the comparator 112 is connected to an output of the D/A converter 111, so an analog signal corresponding to the image data is compared to the integrated signal.

When the signal level of the integrated signal goes above the analog signal from the D/A converter 111, an output of the comparator 112 takes a high level. The output of the comparator 112 is connected to an input of a gate circuit 113, and an output of the gate circuit 113 is connected to the laser drive circuit 106M. Accordingly, the laser drive circuit 106M is supplied with a signal whose pulse width is modulated according to the image data value of each pixel that represent a tonal level or recording density.

The pulse width modulation circuit 105M is provided with a white detection circuit 114, and the image data from the LUT 102 is also fed to the white detection circuit 114. The white detection circuit 114 detects white pixels among the image data, and outputs a signal to the gate circuit 113 for a period while the comparator 112 outputs the signal corresponding to the white pixel. In response to the output signal from the white detection circuit 114, the gate circuit 113 closes its gate. Thereby, the pulse signal from the gate circuit 113 takes a low level for the above period, so the pulses corresponding to the white pixel are eliminated.

The pulse width modulation circuits 105C and 105Y have the same structure as the pulse width modulation circuit 105M. Therefore, the description on these circuits 105C and 105Y is omitted in order to avoid redundancy. It is to be noted that the pixel clock signal from the pixel clock generator 50 is defined for each color on the basis of a main scanning speed of each of the light beams L1, L2 and L3 on the photosensitive material 19 and the resolution or pixel frequency in the main scanning direction. The main scanning speed of each light beam is detected by calculation. Thus, the pixel clock signal for one of the semiconductor lasers 11M, 11C and 11Y is different from that for others.

The laser drive circuit 106M is provided with a D/A converter 120. The D/A converter 120 is connected to the APC controller 103 of the main control section 101. The APC controller 103 supplies the D/A converter 120 with digital drive current control data that represents a level of the drive current for the semiconductor laser 11M. The D/A converter 120 converts the drive current control data into an analog signal, and sends it to a constant current circuit 121. The constant current circuit 121 outputs a drive current of a constant level that is determined in accordance with the level of the input analog signal.

The drive current from the constant current circuit 121 is fed to a modulation circuit 122, which is connected to the pulse width modulation circuit 105M and the semiconductor laser 11M. The modulation circuit 122 raises or lowers the drive current according to the pulse width of the signal from the pulse width modulation circuit, and supplies the modulated drive current to the semiconductor laser 11M.

A light detector 40M for detecting the intensity of the light beam L1 from the semiconductor laser 11M is disposed integrally with or separately from the semiconductor laser 11M. For example, the light detector 40M is a photodiode. An output current from the light detector 40M is fed to a current-voltage conversion circuit 123 that is provided in the laser drive circuit 106M. The current-voltage conversion circuit 123 converts the input current signal into a voltage signal, and input it in an A/D converter 124. The A/D converter 124 converts the analog voltage signal into a digital signal, and input it in the APC controller 103.

Because other two laser drive circuits 106C and 106Y have the same configuration as the laser drive circuit 106M, the description of these laser drive circuits are omitted. It is to be noted that the semiconductor lasers 11C and 11Y are respectively provided with light detectors 40C and 40Y in the same way as the semiconductor laser 11M is provided with the light detector 40M. Output currents from these light detectors 40C and 40Y are also fed to the APC controller 103 through the laser drive circuits 106C and 106Y, like the output signal from the light detector 40M.

In response to the output signal from any of these light detectors 40M, 40C and 40Y, the APC controller 103 controls the drive currents to the semiconductor lasers 11M, 11C and 11Y such that the light output from any of the semiconductor lasers 11M, 11C and 11Y has the same value for the same image data, wherein the output value means a light intensity. Concretely, the APC controller 103 drives the semiconductor lasers 11M, 11C and 11Y for a predetermined short time, e.g. 100 $\mu$ sec., on the basis of drive current control data representative of a set output value of the light beam, in a range excluded from an image output range. With reference to the output signals from the light detectors 40M, 40C and 40Y at that time, the APC controller 103 modifies the value of the drive current control data so as to adjust the light outputs to be equal to the set output value.

The APC controller 103 carries out automatic power controlling each time the start point detector 22 detects the light beam L1, L2 or L3, that is, at the start of each cycle of main scanning of one line. In each main scanning cycle, the image data for recording on line is fed from the LUT 102 to the pulse width modulation circuits 105M, 105C and 105Y, so the pulse width modulation circuits 105M, 105C and 105Y output pulse signals, whose pulse widths are modulated in accordance with the image data of each pixel, to the laser drive circuits 106M, 106C and 106Y respectively. The laser drive circuits 106M, 106C and 106Y modulate the laser drive currents in accordance with the respective input signals, and fed the modulated laser driver currents to the semiconductor lasers 11M, 11C and 11Y.

In this way, the intensity of light beams L1, L2 and L3 are modulated in accordance with the image data of each pixel, and these light beams L1, L2 are deflected by the polygonal mirror 20 to scan the surface of the photosensitive material 19 in the main scan direction. Since the photosensitive material 19 is conveyed in the sub scan direction synchronously with this main scanning, the photosensitive material 19 is exposed to the light beams L1, L2 and L3 two-dimensionally.

As shown in FIG. 1, the exposed photosensitive material 19 is conveyed to a water spreading section 23, to spread water over the photosensitive emulsion surface of the photosensitive material 19. Next, the photosensitive material 19 is conveyed to a heat-developing section 24, where the photosensitive material 19 is laid on an image receiving material 25 and then heated up to transfer the photographed image to the image receiving material 25. After the image is developed and transferred, the photosensitive material 19 is thrown away, and the image receiving material 25 is dried and ejected as a photo-print 26 onto a tray 27. The water spreading section 23 and the heat-developing section 24 are described in Japanese Laid-open Patent Application No. 7-5591.

Because the light beams L1, L2 and L3 from the semiconductor lasers 11M, 11C and 11Y have different light path, if the semiconductor lasers 11M, 11C and 11Y are driven simultaneously, the light beams L1, L2 and L3 would be projected onto the photosensitive material 19 at deviated positions from each other in the main scanning direction, resulting color registration failure. To prevent the color registration failure, driving intervals of the semiconductor lasers 11M, 11C and 11Y are shifted from each other. Concretely, the phases of the pixel clock signals are staggered from each other as they are sent to the pulse width modulation circuits 105M, 105C and 105Y, on the basis of differences between detection times of the light beams L1, L2 and L3 by the start point detector 22, as the light beams L1, L2 and L3 are radiated simultaneously.

As shown in FIG. 4, the pixel clock generator 50 of the controller 104 are respectively provided with oscillators 51M, 51C and 51Y, for generating the three kinds of pixel clock signals CLm, CLc and CLy in accordance with the semiconductor lasers 11M, 11C and 11Y. Output terminals of the oscillators 51M, 51C and 51Y are connected to counters 52M, 52C and 52Y.

The three kinds of clock pulses from the oscillators 51M, 51C and 51Y have different frequencies that are predetermined to make the scanning lengths per one main scanning of the light beams L1, L2 and L3 approximately equal to each other as they are deflected at the same deflection angle. In addition, the frequencies of these clock pulses are determined to satisfy the following conditions:

$$fm:fc:fy=Vm:Vc:Vy=1/Tm:1/Tc:1/Ty$$

wherein fm is the clock frequency of the oscillator 51M, fc is the clock frequency of the oscillator 51C, fy is the clock frequency of the oscillator 51Y, and Vm, Vc and Vy are scanning speeds of the light beams L1, L2 and L3 on the photosensitive material 19, and Tm, Tc and Ty are exposure times to the light beams L1, L2 and L3 at each main scanning respectively.

According to this configuration, chromatic aberrations are corrected by varying the frequencies of the clock signals for the semiconductor lasers 11M, 11C and 11Y, so the f-θ lens 30 itself may have chromatic aberrations to some extent. Therefore, the f-θ lens 30 may be composed of inexpensive lens elements made of cheap glass materials and massproduced as having a flat surface on one side and a cylindrical surface on the other side.

In the present embodiment, the clock frequencies fm and fy of the oscillators 51M and 51Y for the semiconductor lasers 11M and 11Y are determined on the basis of the clock frequency fc of the oscillator 51C for the semiconductor laser 11C.

The counters 52M, 52C and 52Y are also supplied with the detection signals from the start point detecting sensor 22. Each of the counters 52M, 52C and 52Y starts counting a constant time from when the start point detecting sensor 22 detects the light beam L3 from the semiconductor laser 11Y. The constant time is determined for each of the counters 52M, 52C and 52Y in accordance with the differences between the detection times of the light beams L1, L2 and L3 by the start point detecting sensor 22, when the light beams L1, L2 and L3 are radiated simultaneously. First when the counter 52M, 52C or 52Y counts up the constant time, the pixel clock generator 50 outputs the clock pulses from the oscillator 51M, 51C or 51Y as the pixel clock signal CLm, CLc or CLy to the pulse width modulation circuit 105M, 105C and 105Y respectively.

Figure 5:
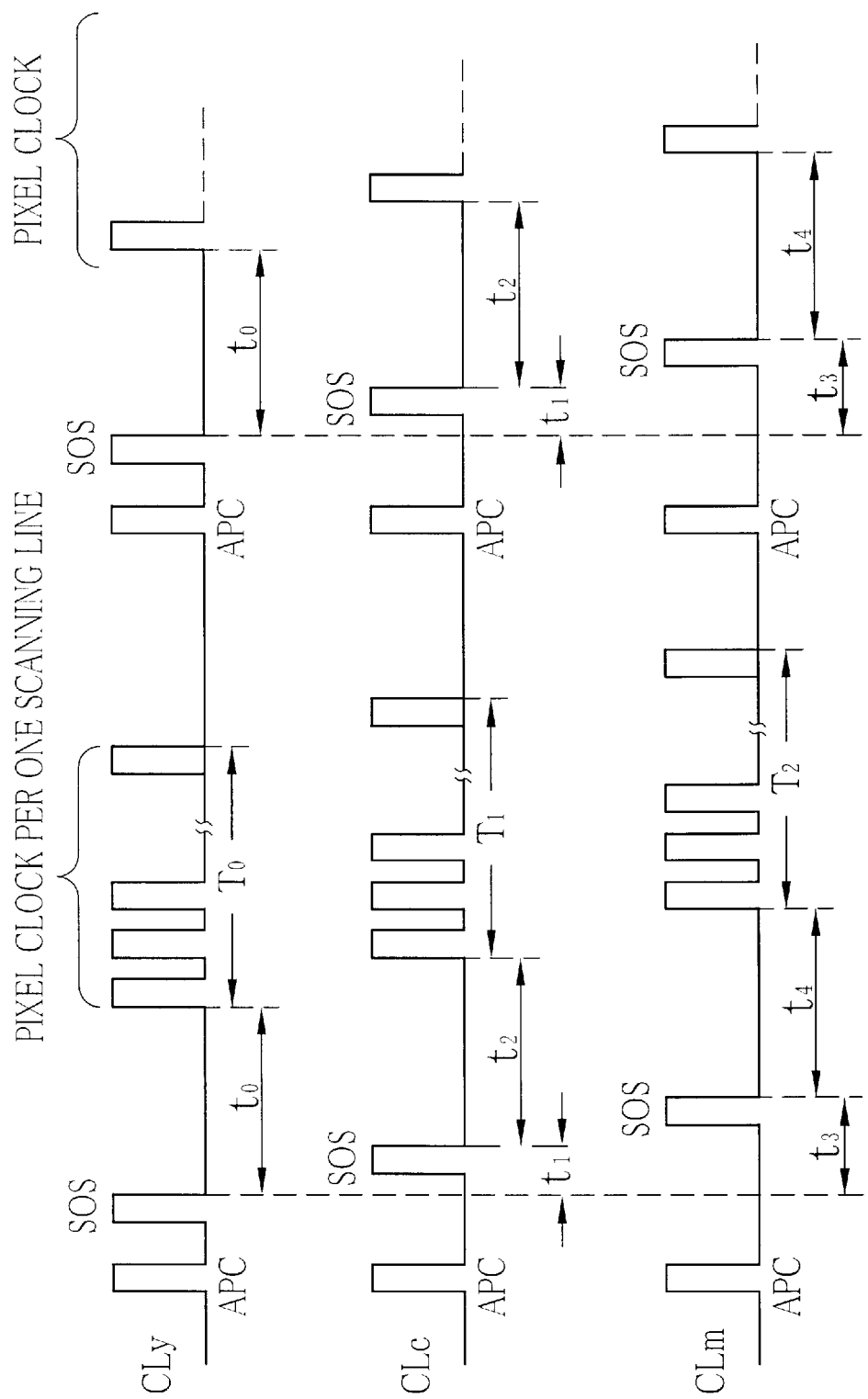
FIG. 5 shows timing charts of pixel clock signals for semiconductor lasers for three colors.

FIG. 5 shows timing charts of the pixels clock signals CLm, CLc and CLy for the semiconductor lasers 11M, 11C and 11Y, respectively. When the start point detecting sensor 22 detects the light beam L3 and outputs an SOS (start of scanning) signal responsive to the light beam L3, the SOS signal is fed to the counter 52Y, so the counter 52Y starts counting a constant time t0 that is predetermined for the counter 52Y. When the counter 52Y counts up the time t0, the counter 52Y begins to output the clock pulses from the oscillator 51Y, to the pulse width modulator 105Y as the pixel clock signal CLy. The counter 52Y stops outputting the pixel clock signal CLy in a time T0 that corresponds to a scanning time of the light beam L3 for one line, i.e. the main scanning period. On the other hand, the time t0 is a delay time from when the light beam L3 is detected by the start point detecting sensor 22 till it reaches the scanning start position on the photosensitive material 19.

When a time t1 has elapsed since the SOS signal being output responsive to the light beam L3, the start point detecting sensor 22 detects the light beam L2, so another SOS signal responsive to the light beam L2 is fed to the counter 52C. Upon this SOS signal, the counter 52C starts counting a constant time t2, and when the time t2 is over, the counter 52C begins to output the clock pulses, that are generated from the oscillator 51C, to the pulse width modulator 105C as the pixel clock signal CLc. The counter 52C stops outputting the pixel clock signal CLc in a time T1 that corresponds to the main scanning period of the light beam L2 per line. On the other hand, the time t1 is a time lag from the detection of the light beam L3 by the start point detecting sensor 22 to the detection of the light beam L2 by the start point detecting sensor 22, whereas the time t2 is a delay time taken for the light beam L2 to move from the start point detecting sensor 22 to the scanning start position on the photosensitive material 19.

In the same way, when a time t3 has elapsed since the SOS signal being output responsive to the light beam L3, the start point detecting sensor 22 detects the light beam L1, so another SOS signal responsive to the light beam L1 is fed to the counter 52M. Upon this SOS signal, the counter 52M starts counting a constant time t4, and when the time t4 is over, the counter 52M begins to output the clock pulses from the oscillator 51M to the pulse width modulator 105M as the pixel clock signal CLm. The counter 52M stops outputting the pixel signal Clm in a time T2 that corresponds to the main scanning period of the light beam L1 per line. On the other hand, the time t3 is a time lag from the detection of the light beam L3 by the start point detecting sensor 22 to the detection of the light beam L1 by the start point detecting sensor 22, whereas the time t4 is a delay time taken for the light beam L1 to move from the start point detecting sensor 22 to the scanning start position on the photosensitive material 19.

By shifting the times of starting outputting the pixel clock signals from the counters 52M, 52C and 52Y from each other in this way, the semiconductor lasers 11M, 11C and 11Y start emitting their light beams at different times for the same main scanning line, so that the scanning start positions of the three color light beams L1 to L3 on the photosensitive material 19 coincide with each other. Also the pixel clock signals for the three color light beams L1 to L3 have different frequencies from each other so that the chromatic aberrations of the f-θ lens 30 may be corrected.

Although the f-θ lens 30 of the above embodiment is composed of only those cylindrical lens elements having a flat surface on one side, the f-θ lens of the present invention is not to be limited to the above embodiment, but may be composed of those lens elements having at least a cylindrical lens surface, insofar as it provides adequate f-θ characteristics. Composing the f-θ lens of those lens elements having at least a cylindrical lens surface contributes to improving productivity of the f-θ lens.

Figure 2B:
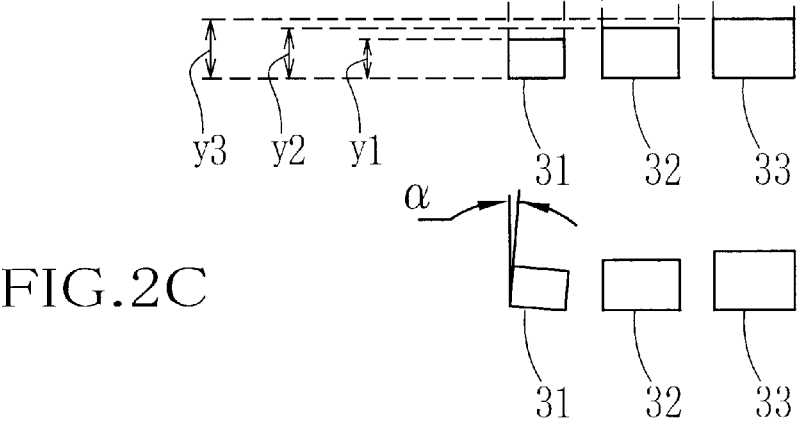
FIG. 2B is a sectional view of the f-θ lens taken along a sub scan direction that is perpendicular to the deflecting direction.
Figure 2C:
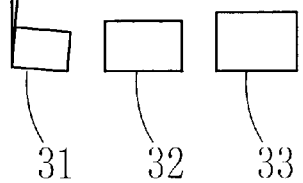
FIG. 2C is a similar view to FIG. 2B, but showing an f-θ lens according to a second embodiment of the present invention.

In the embodiment shown in FIG. 2B, the three lens components of the f-θ lens 30 are arranged parallel to the deflecting direction as well as to the sub scan direction perpendicular to the deflecting direction, it is possible to incline any one of the three lens components relative to the sub scan direction, as shown in FIG. 2C. That is, the lens elements may be inclined about a parallel axis to the deflecting direction. This configuration is effective to prevent interference caused by multiple reflection of light beams between the lens surfaces. Since the interference is prevented, image forming property of the f-θ lens is improved. Especially by inclining the first lens element 31 in the way as shown in FIG. 2C, those light beams multiple-reflected between the polygonal mirror 20 and the first lens element 31 are prevented from being projected toward the photosensitive material 19, so the embodiment of FIG. 2C is effective for preventing ghosts. Insofar as the inclination angle α is several degrees, inclination of any of the lens elements has little influence on the beam diameter of the light beams or the projecting positions on the scanning surface. It is also possible to design the f-θ lens on the premise that any of the lens elements is inclined to the sub scan direction. Thereby, the allowable range of inclination angle α is widened, and the ghost preventing effect is improved.

Figure 2D:
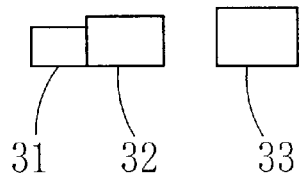
FIG. 2D is a similar view to FIG. 2C, but showing an f-θ lens according to a third embodiment of the present invention.

It is also possible to cement the first and second lens elements 31 and 32 to each other as a doublet, as shown in FIG. 2D. This configuration provides the same effect as the first embodiment shown in FIG. 2B, and also reduces the risk of deviation of the lens elements from their proper positions. Such a deviation would damage the lens performance.

EXAMPLE 1

In Example 1, the frequencies fm, fc and fy of the clock pulses generated from the oscillators 51M, 51C and 51Y are respectively determined as follows:

$$fm{:}fc{:}fy = 1/1.000459 : 1 : 1/0.999620$$

The f-θ lens 30 is composed of first to third lens elements having the same configuration as the embodiment shown in FIG. 2A, and the first and second lens elements 31 and 32 are cemented to each other to form a doublet, as shown in FIG. 2D.

Numerical values for Example 1 are as set forth below.

|f|=373.324 mm

|f1|=153.955 mm

|f23|=98.170 mm

θ=50° wherein f represents the total focal length of the f-θ lens 30, f1 represents the focal length of the first lens element 31, f23 represents a composite focal length of the second and third lens elements, θ represents the deflection angle of the light beams by the polygonal mirror 20.

Table 1 shows lens data of Example 1, wherein i represent the surface serial number in the order from the deflection point, R is the radius of curvature, D the thickness of the lens elements or air space between adjacent lens elements in the unit of millimeter, N the refractive index, and ν the Abbe constant.

TABLE 1

| i | R | D | N | ν |
|---|---|---|---|---|
| DEFLECTION POINT | | 17.0 | | |
| 1 | −72.699 | 5.0 | 1.72825 | 28.32 |
| 2 | ∞ | 0.0 | | |
| 3 | ∞ | 11.0 | 1.51680 | 64.20 |
| 4 | −87.00 | 16.0 | | |
| 5 | ∞ | 15.0 | 1.51680 | 64.20 |
| 6 | −100.800 | 442.460 | | |
| IMAGE PLANE | | | | |

As shown in Table 1, the refractive indexes N1, N2 and N3 of the first to third lens elements 31 to 33 are "1.72825", "1.51680" and "1.51680" respectively, so Example 1 satisfies the condition: N1>N2=N3.

As the Abbe constants ν1, ν2 and ν3 of the first to third lens elements 31 to 33 are "28.32", "64.20" and "64.20" respectively, Example 1 also satisfies the condition: ν1<ν2=ν3.

Since the distance D0 from the deflection point to the lens surface 31a of the first lens element 31 is 17.0 mm, the characteristic value of the present invention: |(f23/f1)·D0|= (98.170/153.955)·17.0≈10.84. So Example 1 satisfies the condition: 4≦|(f23/f1)·D0|≦16.

Figure 6:
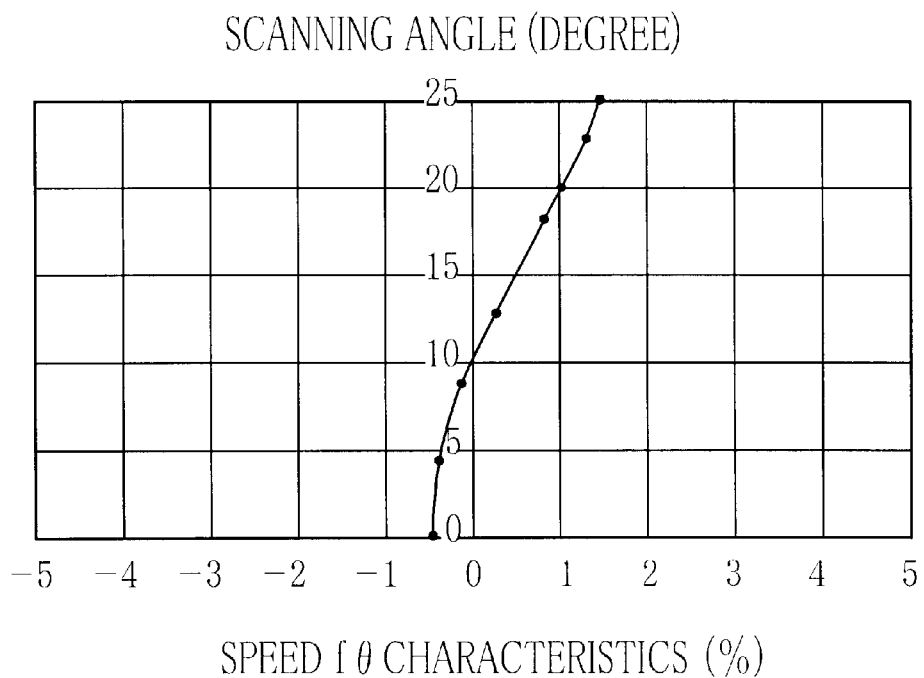
FIG. 6 is a graph showing an f-θ speed characteristic curve of the f-θ lens of the first embodiment.
Figure 7:
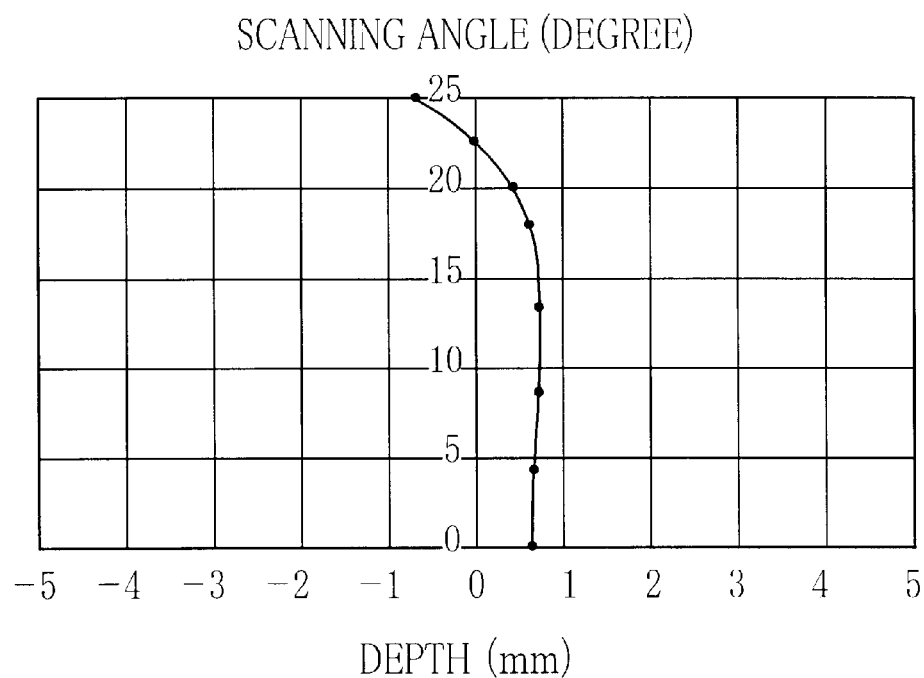
FIG. 7 is a graph showing a curvature of the field of the f-θ lens of the first embodiment.

Speed f-θ characteristics of the f-θ lens of Example 1 is shown in FIG. 6, whereas curvature of the field of Example 1 is shown in FIG. 7. In FIGS. 6 and 7, "scanning angle" indicates angles of rays reflected from the polygonal mirror 20 relative to a center ray that travels from the polygonal mirror 20 along an optical axis of the f-θ lens, and falls onto a center point of the main scanning line perpendicularly to the photosensitive surface 19. Although the respective characteristic curves may actually be shown in a range of scanning angle from −25° to +25°, the range from −25° to 0° is omitted, because the characteristic curves are symmetrical about the center scanning angle of 0°, that is equivalent to the incident angle of the center ray onto the photosensitive surface 19.

EXAMPLE 2

In the Example 2, the frequencies fm, fc and fy of the clock pulses generated from the oscillators 51M, 51C and 51Y are respectively determined as follows:

fm:fc:fy=1/1.000582:1:1/0.999532

The f-θ lens 30 is composed of first to third lens elements having the same configuration as the embodiment shown in FIG. 2A, and the first to third lens elements 31 to 33 are arranged separately from each other in a manner as shown in FIG. 2B.

Numerical values for Example 2 are as set forth below, and Table 2 shows lens data of Example 2.

|f|=276.541 mm

|f1|=112.901 mm

|f23|=93.597 mm

θ=67°

TABLE 2

| i | R | D | N | ν |
|---|---|---|---|---|
| DEFLECTION POINT | | 16.0 | | |
| 1 | −80.600 | 5.9 | 1.72825 | 28.32 |
| 2 | ∞ | 4.1 | | |
| 3 | ∞ | 10.0 | 1.51680 | 64.20 |
| 4 | −77.750 | 4.5 | | |
| 5 | ∞ | 10.5 | 1.51680 | 64.20 |
| 6 | −115.400 | 326.057 | | |
| IMAGE PLANE | | | | |

As shown in Table 2, the refractive indexes N1, N2 and N3 of the first to third lens elements 31 to 33 are "1.72825", "1.51680" and "1.51680" respectively, so Example 2 satisfies the condition: N1>N2=N3.

As the Abbe constants ν1, ν2 and ν3 of the first to third lens elements 31 to 33 are "28.32", "64.20" and "64.20" respectively, Example 2 also satisfies the condition: ν1<ν2=ν3.

Since the distance D0 from the deflection point to the lens surface 31a of the first lens element 31 is 16.0 mm, the characteristic value of the present invention: |(f23/f1)·D0|= (93.597/112.901)·16.0≈13.26. Example 2 satisfies the condition: 4≦|(f23/f1)·D0|≦16.

Figure 8:
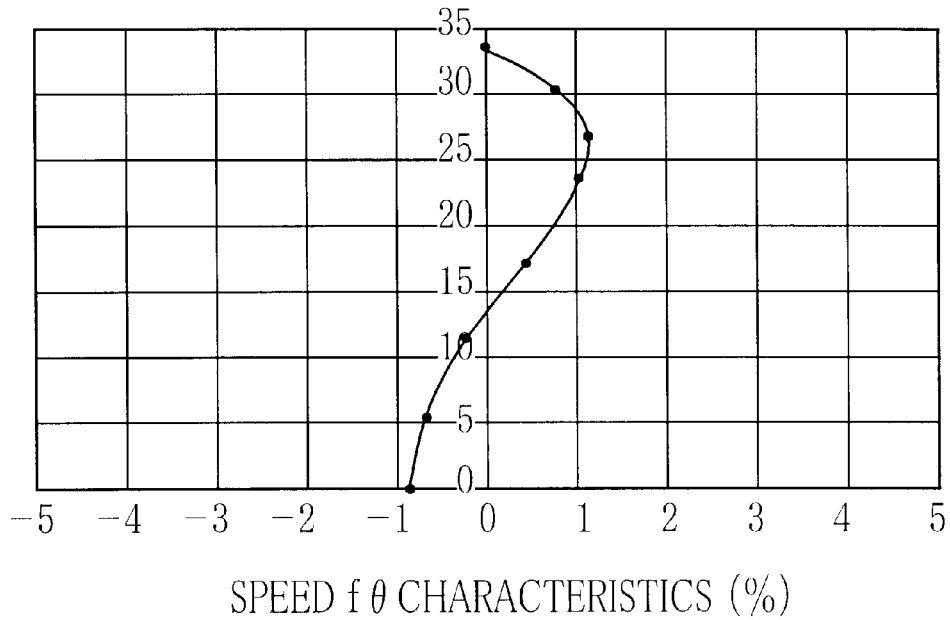
FIG. 8 is a graph showing an f-θ speed characteristic curve of the f-θ lens of the second embodiment.
Figure 9:
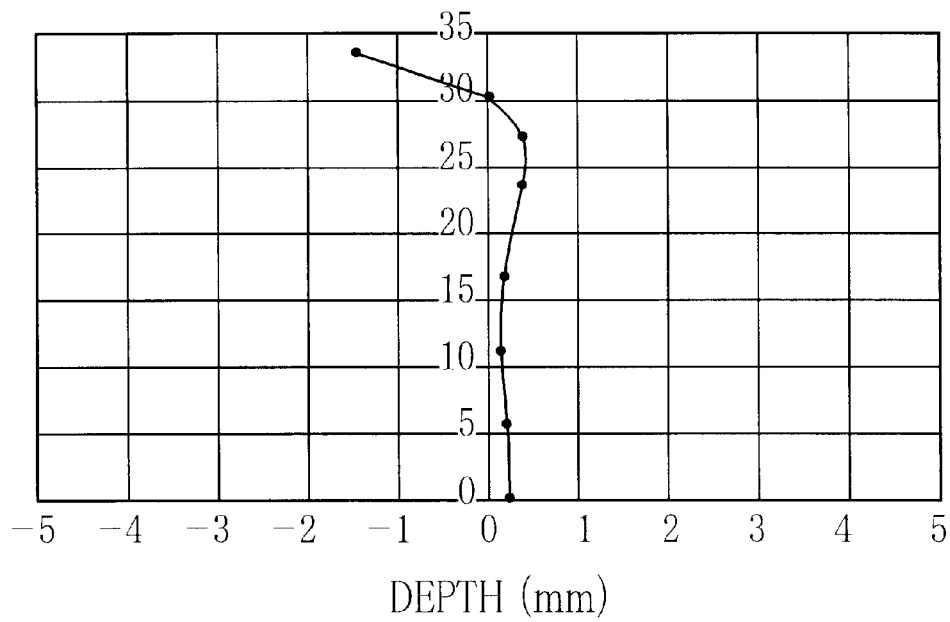
FIG. 9 is a graph showing a curvature of the field of the f-θ lens of the second embodiment.
Figure 10:
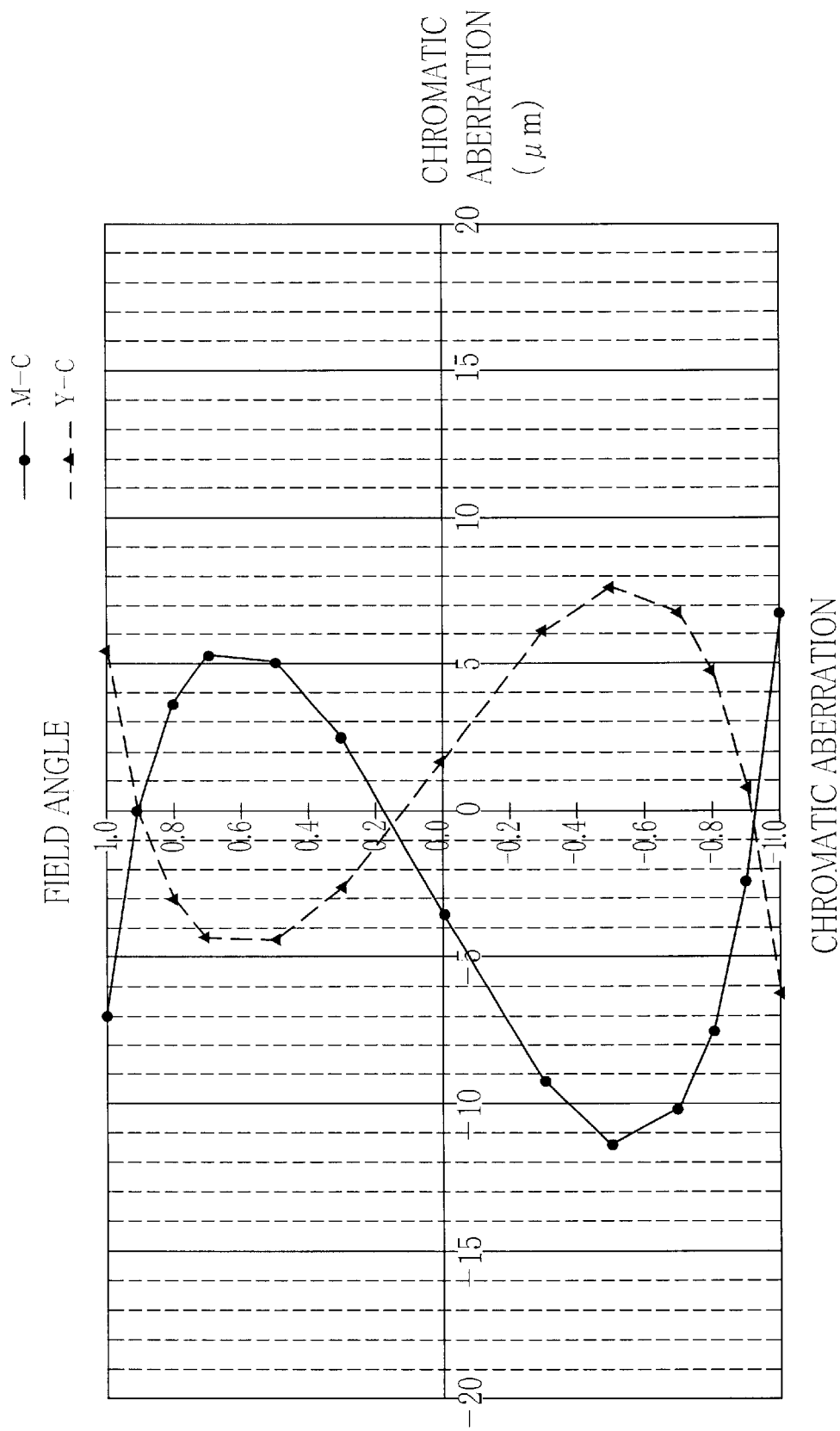
FIG. 10 is a graph showing chromatic aberrations of the f-θ lens of the second embodiment.

Speed f-θ characteristics of the f-θ lens of Example 2 is shown in FIG. 8, whereas curvature of the field of Example 2 is shown in FIG. 9. Although the respective characteristic curves may actually be shown in a scanning angle range from −33.5° to +33.5°, the range from −33.5° to 0° is omitted, because the characteristic curves are symmetrical about the center scanning angle of 0°. FIG. 10 shows chromatic aberrations of the imaging apparatus of the present invention using the f-θ lens of Example 2, wherein projection intervals or phases of the light beams L1 to L3 are staggered by use of different clock signals in a manner as set forth above with reference to FIG. 5. In FIG. 10, "view angle" is a value obtained by standardizing a scanning angle with respect to the maximum scanning angle, "M–C" represents the chromatic aberration between the light beam L1 for magenta and the light beam L2 for cyan, and "Y–C" represents the chromatic aberration between the light beam L3 for yellow and the light beam L2 for cyan.

EXAMPLE 3

In Example 3, the frequencies fm, fc and fy of the clock pulses generated from the oscillators 51M, 51C and 51Y are respectively determined as follows:

fm:fc:fy=1/1.000800:1:1/0.999371

The f-θ lens 30 is composed of first to third lens elements having the same configuration as the embodiment shown in FIG. 2A, and the first and second lens elements 31 and 32 are cemented to each other to form a doublet, as shown in FIG. 2D. Numerical values for Example 3 are as set forth below, and Table 3 shows lens data of Example 3.

|f|=232.642 mm

|f1|=367.396 mm

|f23|=132.803 mm

θ=80°

TABLE 3

| i | R | D | N | ν |
|---|---|---|---|---|
| DEFLECTION POINT | | 30.0 | | |
| 1 | −191.425 | 8.0 | 1.80518 | 25.46 |
| 2 | ∞ | 0.0 | | |
| 3 | ∞ | 15.0 | 1.51680 | 64.20 |
| 4 | −138.027 | 10.0 | | |
| 5 | ∞ | 23.0 | 1.51680 | 64.20 |
| 6 | −121.404 | 247.195 | | |
| IMAGE PLANE | | | | |

As shown in Table 3, the refractive indexes N1, N2 and N3 of the first to third lens elements 31 to 33 are "1.80518", "1.51680" and "1.51680" respectively, so Example 3 satisfies the condition: N1>N2=N3.

As the Abbe constants ν1, ν2 and ν3 of the first to third lens elements 31 to 33 are "25.46", "64.20" and "64.20" respectively, Example 3 also satisfies the condition: ν1<ν2=ν3.

Since the distance D0 from the deflection point to the lens surface 31a of the first lens element 31 is 30.0 mm, the characteristic value of the present invention: |(f23/f1)·D0|=(132.803/367.396)·30.0≈10.84. So Example 3 satisfies the condition: 4≦|(f23/f1)·D0|≦16.

Figure 11:
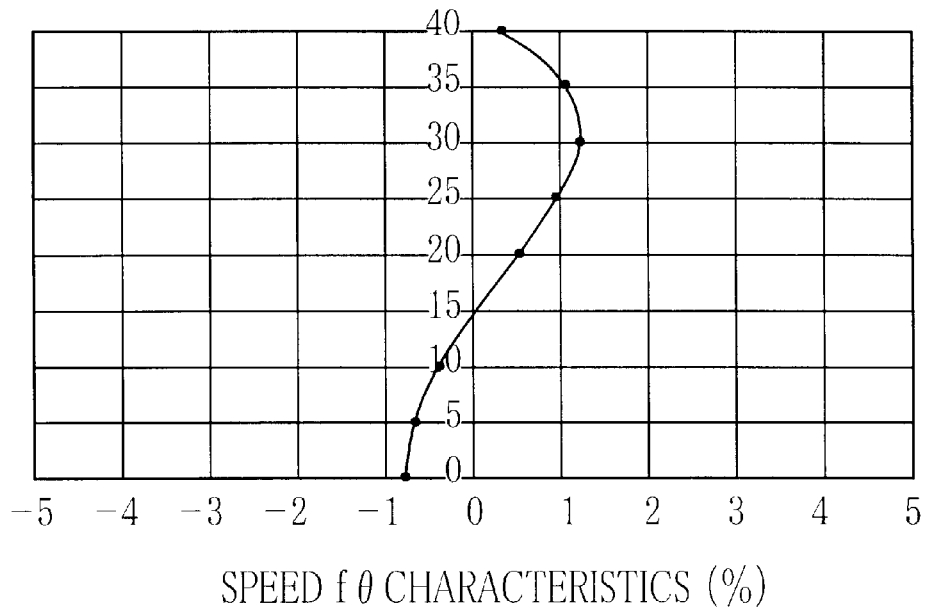
FIG. 11 is a graph showing an f-θ speed characteristic curve of the f-θ lens of the third embodiment.
Figure 12:
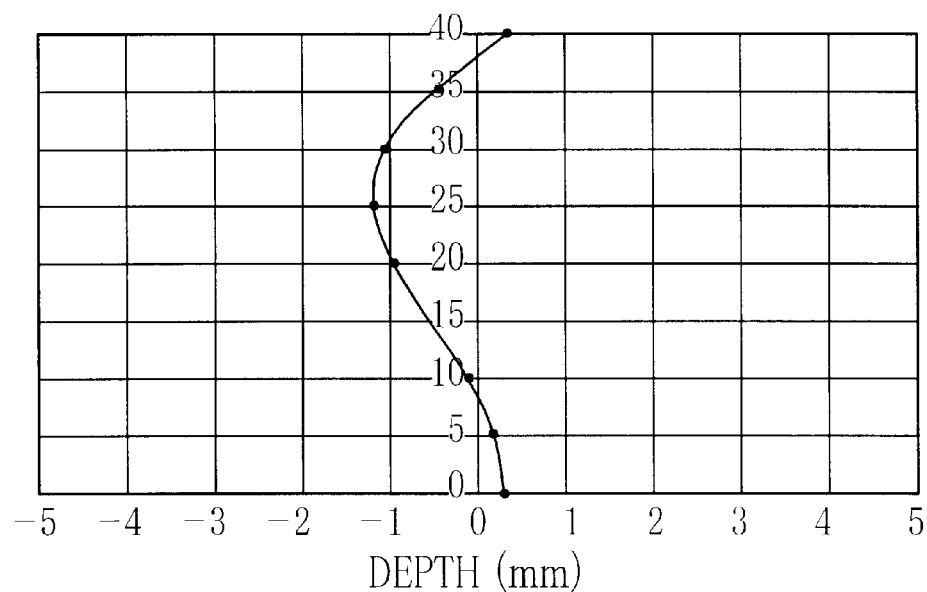
FIG. 12 is a graph showing a curvature of the field of the f-θ lens of the third embodiment.
Figure 13:
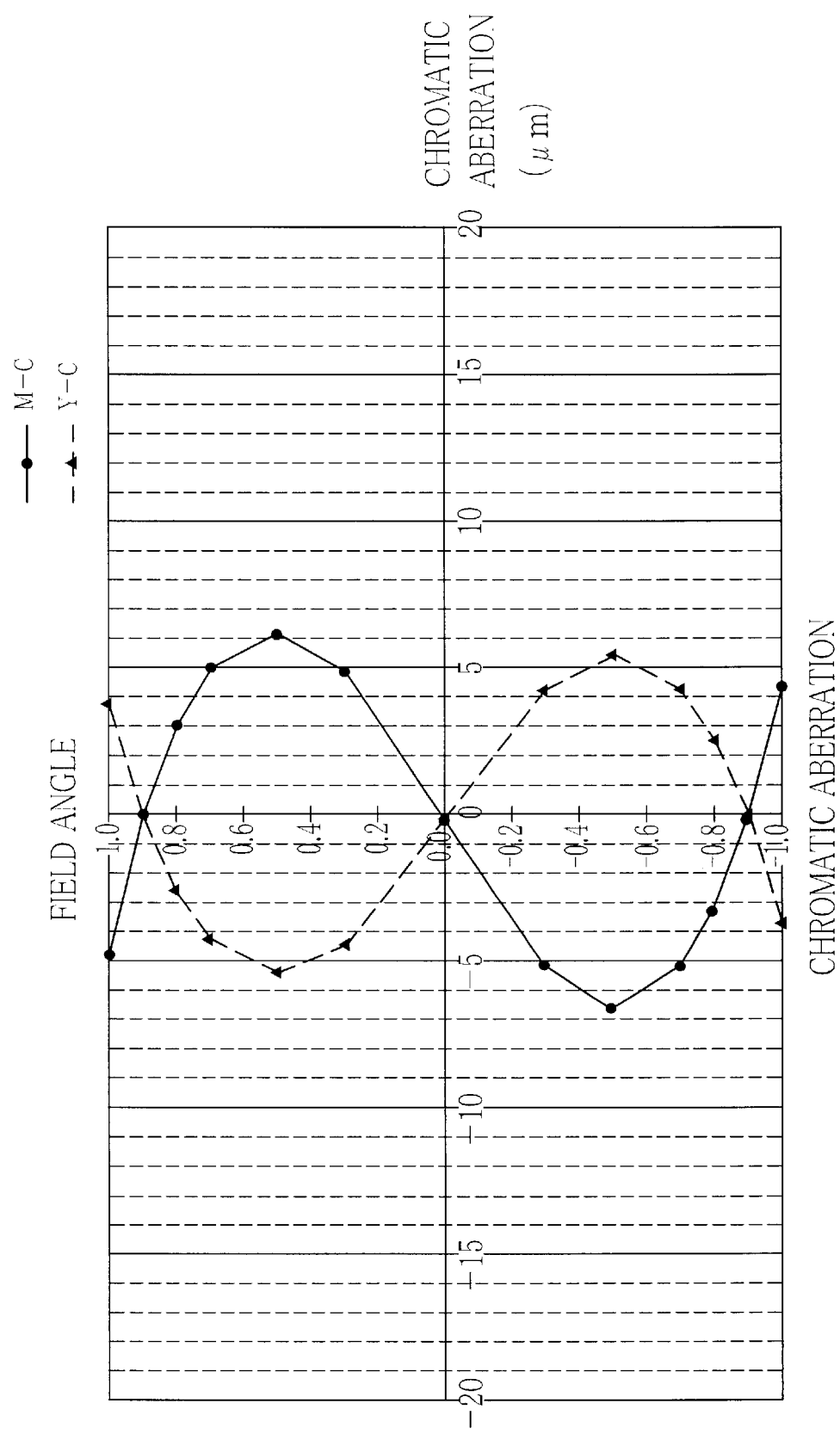
FIG. 13 is a graph showing chromatic aberrations of the f-θ lens of the third embodiment.

Speed f-θ characteristics of the f-θ lens of Example 3 is shown in FIG. 11, whereas curvature of the field of Example 3 is shown in FIG. 12. Although the respective characteristic curves may actually be shown in a scanning angle range from −40° to +40°, FIGS. 11 and 12 show the range from 0° to 40°, because the characteristic curves are symmetrical about the center scanning angle. Chromatic aberrations of an imaging apparatus of the present invention using the f-θ lens of Example 3 is shown in FIG. 13, wherein "view angle" is a value obtained by standardizing a scanning angle with respect to the maximum scanning angle, "M–C" and "Y–C" represent the chromatic aberrations provided when the light beams L1 to L3 are projected at staggered phases in a manner as described with reference to FIG. 5.

COMPARATIVE 1

As a comparative to the f-θ lens of the present invention, speed f-θ characteristics and curvature of the field were measured with respect to an f-θ lens that has a similar configuration to Example 2, and the three lens elements are made of the same material as Example 2, but does not satisfies the condition: 4≦|(f23/f1)·D0|≦16.

Numerical values for Comparative 1 are as set forth below, and Table 4 shows lens data of Comparative 1.

|f1|=70.037 mm

|f23|=72.353 mm

|D0|=16.0 mm

θ=67°

Since the characteristic value of Comparative: |(f23/f1)·D0|=(72.353/70.037)·16.0≈16.53, Comparative 1 does not satisfies the condition: 4≦|(f23/f1)·D0|≦16.

TABLE 4

| i | R | D | N | ν |
|---|---|---|---|---|
| DEFLECTION POINT | | 16.0 | | |
| 1 | −50.600 | 5.9 | 1.72825 | 28.32 |
| 2 | ∞ | 4.1 | | |
| 3 | ∞ | 10.0 | 1.51680 | 64.20 |
| 4 | −77.750 | 4.5 | | |
| 5 | ∞ | 10.5 | 1.51680 | 64.20 |
| 6 | −65.385 | 326.057 | | |
| IMAGE PLANE | | | | |

As shown in Table 4, Comparative 1 satisfies the condition: N1>N2=N3, and the condition: ν1<ν2=ν3.

According to the results of measurement, the f-θ lens of Comparative 1 has a variation of 10% in the speed f-θ characteristics, and the curvature of the field of Comparative 1 is 80 mm. Comparative 1 is therefore insufficient for use as the f-θ lens in an imaging apparatus.

COMPARATIVE 2

As a comparative to the f-θ lens of the present invention, speed f-θ characteristics and curvature of the field were measured with respect to an f-θ lens that has a similar configuration to Example 3, and the three lens elements are made of the same material as Example 3, but does not satisfies the condition: 4≦|(f23/f1)·D0|≦16.

Numerical values for Comparative 2 are as set forth below, and Table 5 shows lens data of Comparative 2.

|f1|=1439.450 mm

|f23|=191.373 mm

|D0|=30.0 mm

θ=80°

Since the characteristic value: |(f23/f1)·D0|=(191.373/1439.450)·30.0≈3.99, Comparative 2 does not satisfies the condition: 4≦|(f23/f1)·D0|≦16.

TABLE 5

| i | R | D | N | ν |
|---|---|---|---|---|
| DEFLECTION POINT | | 30.0 | | |
| 1 | −750.000 | 8.0 | 1.80518 | 25.46 |
| 2 | ∞ | 0.0 | | |
| 3 | ∞ | 15.0 | 1.51680 | 64.20 |
| 4 | −138.027 | 10.0 | | |
| 5 | ∞ | 23.0 | 1.51680 | 64.20 |
| 6 | −305.808 | 247.195 | | |
| IMAGE PLANE | | | | |

As shown in Table 5, Comparative 2 satisfies the condition: N1>N2=N3, and the condition: ν1<ν2=ν3.

According to the results of measurement, the f-θ lens of Comparative 2 has a variation of 2.7% in the speed f-θ characteristics, and the curvature of the field of Comparative 1 is 26 mm. Comparative 2 is therefore insufficient for use as the f-θ lens in an imaging apparatus.

Although the pixel clock generator 50 is provided with three sets of oscillators and counters for the three color semiconductor lasers in the above embodiment, the pixel clock generator may have another configuration insofar as it can generate three kinds of clock signals in accordance with the three color light beams.

In the above embodiment, the photosensitive material 19 is placed perpendicularly to a deflection plane of the light beams from the polygonal mirror 20, the photosensitive material 19 may be placed in parallel to the deflection plane. In that case, the layout and mounting angles of the reflection mirror 17 and the cylindrical mirror 18 should be modified correspondingly.

Although the start point detecting sensor 22 is determined to detect the three kinds of light beams L1 to L3 for the sake of shifting output timings of the three kinds of pixel clock signals, it is possible to shift the output timings of the pixel clock signals on the basis of the time when the start point detecting sensor 22 detects a predetermined one of the three kinds of light beams. In that case, the time lag values between the detection times of the three kinds of light beams by the start point detecting sensor 22 are previously stored, the output timings of the pixel clock signals are shifted by the stored time lag values from a time when the start point detecting sensor 22 detects the predetermined kind of light beam.

It is also possible to modify the layout of the optical system to adjust the optical paths of the three kinds of light beams such that their optical axes coincide with each other before they fall on the polygonal mirror. According to this configuration, the output timings of the pixel clock signals may be shifted with reference to the detection time of the predetermined one kind of light beam by the start point detecting sensor 22, if the chromatic aberrations of the magnification of the f-θ lens are very small. If, on the contrary, the chromatic aberrations of the magnification of the f-θ lens are large, it is necessary to detect all kinds of light beams and shift the output timings of the pixel clock signals in accordance with the lags between the detection times of the respective light beams by the start point detecting sensor 22.

The photosensitive material 19 is not to be limited to the above described heat-developing image transfer type, but may be a type that is developed by going through many kinds of processing baths. An example of exposure device for use with this type of photosensitive material is disclosed for example in Japanese Laid-open Patent Application No. 11-88619. The laser light sources for this case may be semiconductor lasers or solid-state lasers radiating three kinds of laser beams of R-wavelength (e.g. 685 nm), G-wavelength (e.g. 532 nm) and B-wavelength (e.g. 473 nm) respectively.

Although the present invention has been described so far with respect to the color imaging apparatus and the f-θ lens mounted therein, the f-θ lens of the present invention is applicable to any other optical exposure devices, such as an image output apparatus used in a photographic printing system installed in a large-scale photo-lab. In that case, the f-θ lens of the present invention or a unit including the f-θ lens of the present invention is substituted for a conventional f-θ lens or a unit including the conventional f-θ lens. The f-θ lens and the beam scanning device of the present invention is not only applicable to the optical exposure devices, but also applicable to any other apparatuses which scan light beams across a scanning plane at an approximately constant speed, like some kinds of display devices.

Although the f-θ lens is composed of three lens elements in the above embodiment, the number of the lens elements of the f-θ lens of the present invention may be modified appropriately.

Thus, the present invention is not to be limited to the above embodiments but, on the contrary, various modification will be possible to those skilled in the art without departing from the scope of claims appended hereto.

What is claimed is:

1. An f-θ lens placed between an optical deflection device that deflects light beams at an approximately constant angular speed in a deflecting direction, and a scanning plane, for converging the deflected light beams on said scanning plane such that said light beams scan said scanning plane at an approximately constant speed in a scanning direction, wherein said scanning plane is flat in the scanning direction of said light beams, said f-θ lens comprising:

a first lens element having a negative power of refraction, a second lens element having a positive power of refraction and a third lens element having a positive power of refraction, arranged in this order from the side of said optical deflection device, wherein at least one surface of said lens elements is a cylindrical surface that has a refractive power only in the deflecting direction, wherein at least one side of each of said lens elements is formed as said cylindrical surface.

2. An f-θ lens as recited in claim 1, wherein one side of each of said lens elements is formed as said cylindrical surface, and the opposite side from said cylindrical surface is formed as a flat surface.

3. An f-θ lens as recited in claim 2, wherein said cylindrical surface of said first lens element is concave and located on the side of said optical deflection device, whereas said cylindrical surfaces of said second and third lens elements are convex and located on the side of said scanning plane.

4. An f-θ lens as recited in claim 1, wherein said f-θ lens satisfies the following conditions:

$$N1>N2=N3$$

$$v1<v2=v3$$

wherein N1, N2 and N3 represent refractive indexes of said first to third lens elements, and v1, v2 and v3 represent Abbe constants of said first to third lens elements respectively.

5. An f-θ lens as recited in claim 1, where said f-θ lens satisfies the following condition:

$$4\ mm \leq |f23/f1 \cdot DO| \leq 16\ mm$$

wherein f1 represents the focal length of said first lens element, f23 represents the composite focal length of said second and third lens elements, and DO represents a distance from said optical deflection device to the lens surface of said first lens element that is one the side of said optical deflection device.

6. An f-θ lens as recited in claim 1, wherein said first and second lens elements are cemented to each other.

7. An f-θ lens as recited in claim 1, wherein at least one of said lens elements is inclined about an axis that extends parallel to the deflecting direction of said light beams.

8. An f-θ lens as recited in claim 7, wherein at least said first lens element is inclined about an axis that extends parallel to the deflecting direction of said light beams.

9. An f-θ lens placed between an optical deflection device that deflects light beams at an approximately constant angular speed in a deflecting direction, and a scanning plane, for converging the deflected light beams on said scanning plane such that said light beams scan said scanning plane at an approximately constant speed in a scanning direction, wherein said scanning plane is flat in the scanning direction of said light beams, said f-θ lens comprising:

a first lens element having a negative power of refraction, a second lens element having a positive power of refraction and a third lens element having a positive power of refraction, arranged in this order from the side of said optical deflection device, wherein at least one surface of said lens elements is a cylindrical surface that has a refractive power only in the deflecting direction, wherein at least one side of each of said lens elements is formed as said cylindrical surface, wherein said f-θ lens satisfies the following relationship:

$$y1 \leq y2 \leq y3$$

y1, y2 and y3 represent heights of said first to third lens elements in a perpendicular direction to the deflecting direction of said light beams as well as to an optical axis of said f-θ lens, respectively.

10. A beam scanning device comprising:
a light source for emitting light beams;
an optical deflection device that cyclically deflects said light beams at an approximately constant angular speed in a deflecting direction; and
an f-θ lens placed in optical paths of the deflected light beams from said optical deflection device, for converging said light beams on a scanning plane such that said light beams scan said scanning plane at an approximately constant speed in a scanning direction, wherein said scanning plane is flat in the scanning direction of said light beams, and said f-θ lens comprises a first lens element having a negative power of refraction, a second lens element having a positive power of refraction and a third lens element having a positive power of refraction, arranged in this order from the side of said optical deflection device, wherein at least one surface of said lens elements is a cylindrical surface that has a refractive power only in the deflecting direction, wherein at least one side of each of said lens elements of said f-θ lens is formed as said cylindrical surface.

11. A beam scanning device as recited in claim 10, wherein each of said lens elements has a flat surface on the opposite side from said cylindrical surface.

12. A beam scanning device as recited in claim 11, wherein each of said three lens elements has a flat surface on the opposite side from said cylindrical surface.

13. A beam scanning device as recited in claim 11, wherein said cylindrical surface of said first lens element is concave and located on the side of said optical deflection device, whereas said cylindrical surfaces of said second and third lens elements are convex and located on the side of said scanning plane.

14. A beam scanning device as recited in claim 10, wherein said f-θ lens satisfies the following conditions:

$$N1 > N2 = N3$$

$$v1 < v2 = v3$$

wherein N1, N2 and N3 represent refractive indexes of said first to third lens elements, and v1, v2 and v3 represent Abbe constants of said first to third lens elements respectively.

15. A beam scanning device as recited in claim 10, wherein said f-θ lens satisfies the following condition:

$$4 \text{ mm} \leq |f23/f1 \cdot DO| \leq 16 \text{ mm}$$

wherein f1 represents the focal length of said first lens element, f23 represents the composite focal length of said second and third lens elements, and DO represents a distance from said optical deflection device to the lens surface of said first lens element that is on the side of said optical deflection device.

16. A beam scanning device as recited in claim 10, wherein said first and second lens elements are cemented to each other.

17. A beam scanning device as recited in claim 10, wherein said at least one of said lens elements is inclined about an axis that extends parallel to the deflecting direction of said light beams.

18. A beam scanning device as recited in claim 16, wherein at least said first lens element is inclined.

19. A beam scanning device comprising:
a light source for emitting light beams;
an optical deflection device that cyclically deflects said light beams at an approximately constant angular speed in a deflecting direction; and
an f-θ lens placed in optical paths of the deflected light beams from said optical deflection device, for converging said light beams on a scanning plane such that said light beams scan said scanning plane at an approximately constant speed in a scanning direction, wherein said scanning plane is flat in the scanning direction of said light beams, and said f-θ lens comprises a first lens element having a negative power of refraction, a second lens element having a positive power of refraction and a third lens element having a positive power of refraction, arranged in this order from the side of said optical deflection device, wherein at least one surface of said lens elements is a cylindrical surface that has a refractive power only in the deflecting direction, wherein at least one side of each of said lens elements of said f-θ lens is formed as said cylindrical surface, wherein said f-θ lens satisfies the following relationship:

$$y1 \leq y2 \leq y3$$

wherein y1, y2 and y3 represent heights of said first to third lens elements in a perpendicular direction to the deflecting direction of said light beams as well as to an optical axis of said f-θ lens, respectively.

20. A color imaging apparatus comprising:
a light source having a plurality of light emitting elements for emitting light beams of different wavelengths;
an optical deflection device that cyclically deflects said light beams at an approximately constant angular speed in a deflecting direction;
an f-θ lens placed in optical paths of the deflected light beams from said optical deflection device, for converging said light beams on a photosensitive surface such that said light beams scan said photosensitive surface at an approximately constant speed in a scanning direction, wherein said photosensitive surface is held flat in the scanning direction of said light beams, and at least one surface of lens elements of said f-θ lens is a cylindrical surface that has a refractive power only in the deflecting direction;
a clock signal generating device that generates a plurality of clock signals of different frequencies for deciding output timings of said light beams such that said light beams scan said photosensitive surface from an equal scanning start point through an approximately constant length in the scanning direction; and
a light modulation device for modulating said light beams on the basis of said clock signals and image data.

21. A color imaging apparatus as recited in claim 20, wherein said light source has at least three light emitting elements for emitting at least three kinds of light beams having different wavelengths, whereas said clock signal generating device generate at least three kinds of clock signals whose frequencies are determined by said different wavelengths in one-to-one relationship.

22. A color imaging apparatus as recited in claim 21, further comprising a sensor that detects said deflected light beams before said deflected light beams reach said scanning start point, wherein said clock signal generating device decides the output timing of a predetermined kind of said light beams on the basis of a detection time of said predetermined kind of light beam by said sensor, and decides the output timings of other of said light beams on the basis of the output timing of said predetermined kind light beam and differences between detection times of the light beams by said sensor when the light beams are emitted concurrently for a short time.

23. A color imaging apparatus as recited in claim 20, wherein at least one side of each of said lens elements of said f-θ lens is formed as said cylindrical surface.

24. A color imaging apparatus as recited in claim 23, wherein each of said lens elements has a flat surface on the opposite side from said cylindrical surface.

25. A color imaging apparatus as recited in claim 24, wherein said f-θ lens comprises a first lens element having a negative power of refraction, a second lens element having a positive power of refraction and a third lens element having a positive power of refraction, arranged in this order from the side of said optical deflection device.

26. A color imaging apparatus as recited in claim 25, wherein said first lens element has a concave cylindrical surface on the side of said optical deflection device, whereas said second and third lens elements have convex cylindrical surfaces on the side of said scanning plane.

27. A color imaging apparatus as recited in claim 25, wherein said f-θ lens satisfies the following conditions:

$$N1 > N2 = N3$$

$$v1 < v2 = v3$$

wherein N1, N2 and N3 represent refractive indexes of said first to third lens elements, and v1, v2 and v3 represent Abbe constants of said first to third lens elements respectively.

28. A color imaging apparatus as recited in claim 25, wherein said f-θ lens satisfies the following condition:

$$4 \text{ mm} \leq |f23/f1 \cdot DO| \leq 16 \text{ mm}$$

wherein f1 represents the focal length of said first lens element, f23 represents the composite focal length of said second and third lens elements, and DO represents a distance from said optical deflection device to the lens surface of said lens element that is on the side of said optical deflection device.

29. A color imaging apparatus as recited in claim 25, wherein said first and second lens elements are cemented to each other.

30. A color imaging apparatus as recited in claim 25, wherein said at least one of said lens elements is inclined about an axis that extends parallel to the deflecting direction of said light beams.

31. A color imaging apparatus as recited in claim 30, wherein at least said first lens element is inclined.

32. A color imaging apparatus comprising:

a light source having a plurality of light emitting elements for emitting light beams of different wavelengths;

an optical deflection device that cyclically deflects said light beams at an approximately constant angular speed in a deflecting direction;

an f-θ lens placed in optical paths of the deflected light beams from said optical deflection device, for converging said light beams on a photosensitive surface such that said light beams scan said photosensitive surface at an approximately constant speed in a scanning direction, wherein said photosensitive surface is held flat in the scanning direction of said light beams, and at least one surface of lens elements of said f-θ lens is a cylindrical surface that has a refractive power only in the deflecting direction;

a clock signal generating device that generates a plurality of clock signals of different frequencies for deciding output timings of said light beams such that said light beams scan said photosensitive surface from an equal scanning start point through an approximately constant length in the scanning direction; and a light modulation device for modulating said light beams on the basis of said clock signals and image data, wherein heights of said lens elements of said f-θ lens in a perpendicular direction to the deflecting direction as well as to an optical axis of said f-θ lens are lowered from one another toward said optical deflection device.

33. An f-θ as recited in claim 1, wherein each cylindrical surface of each lens element comprises a constant rate of curvature from a top-most portion of the lens element to a bottom-most portion of the lens element.

34. A beam scanning device as recited in claim 10, wherein each cylindrical surface of each lens element comprises a constant rate of curvature from a top-most portion of the lens element to a bottom-most portion of the lens element.

35. A color imaging apparatus as recited in claim 26, wherein each cylindrical surface of each lens element comprises a constant rate of curvature from a top-most portion of the lens element to a bottom-most portion of the lens element.

* * * * *